(12) United States Patent
Speth

(10) Patent No.: US 7,551,695 B2
(45) Date of Patent: Jun. 23, 2009

(54) VERIFICATION OF THE ANTENNA WEIGHTS OF THE BASE STATION IN A UMTS MOBILE RADIO RECEIVER BY USE OF THE VITERBI ALGORITHM WITH FED-BACK TRANSMISSION DIVERSITY

(75) Inventor: Michael Speth, Krefeld (DE)

(73) Assignee: Infineon Technologies AG, Munich (DE)

( * ) Notice: Subject to any disclaimer, the term of this patent is extended or adjusted under 35 U.S.C. 154(b) by 606 days.

(21) Appl. No.: 10/976,398

(22) Filed: Oct. 29, 2004

(65) Prior Publication Data

US 2005/0152263 A1    Jul. 14, 2005

(30) Foreign Application Priority Data

Oct. 31, 2003    (DE) ................................ 103 51 051

(51) Int. Cl.
*H04L 27/06*    (2006.01)
(52) U.S. Cl. ......................... 375/341; 375/262; 375/265
(58) Field of Classification Search ................. 375/347, 375/262, 265, 341
See application file for complete search history.

(56) References Cited

U.S. PATENT DOCUMENTS

| | | | | | |
|---|---|---|---|---|---|
| 5,905,742 | A | * | 5/1999 | Chennakeshu et al. | 714/792 |
| 7,116,723 | B2 | * | 10/2006 | Kim et al. | 375/267 |
| 7,180,956 | B1 | * | 2/2007 | Banister | 375/267 |
| 2003/0003873 | A1 | * | 1/2003 | Raghothaman | 455/67.1 |
| 2003/0142755 | A1 | * | 7/2003 | Chi et al. | 375/265 |
| 2004/0037202 | A1 | * | 2/2004 | Brommer et al. | 369/94 |
| 2004/0252794 | A1 | * | 12/2004 | Hwang et al. | 375/341 |

OTHER PUBLICATIONS

"Trelliscodierung" ,J. Huber, Berlin [u.a.] Springer, 1992, (Nachrichtentechnik 21), ISBN: 3-540-55792-X, 4 pgs.
ETSI TS 125 214 V5.6.0 (Sep. 2003), (Universal Mobile Telecommunications System UMTS), Physical Layer Procedures (FDD), (3GPP TS 25.214 version 5.6.0 Release 5), 33 pgs.
3GPP TS 25.214 Version 5.6.0 (Sep. 2003) 3$^{rd}$ Generation Partnership Project Technical Specification Group Radio Access Network; Physical layer procedures (FDD) (Release 5); Internet <http://www.3gpp.org/ftp/Specs/2003-09/Re-5/25_series/25214-560.zip>.

* cited by examiner

*Primary Examiner*—Shuwang Liu
*Assistant Examiner*—David Huang
(74) *Attorney, Agent, or Firm*—Eschweiler & Associates, LLC

(57) ABSTRACT

A mobile station sends to the base stations a bit vector which contains weighting factors (w1, w2) for the amplitudes and/or the phases of the signals to be emitted from the antennas. The bit vector is updated by changing one bit position for each time slot, and by transmitting this from the mobile station to the base station in the form of a bit (e.g., an FBI (feedback information) bit). A trellis diagram can be set up comprising the possible states of the bit vector and the possible state changes (branches) and the Viterbi algorithm can be used for the determination of the weighting factors actually used by the base station, taking account of both the currently transmitted training symbols and the previously transmitted training symbols.

4 Claims, 3 Drawing Sheets

VERIFICATION OF THE ANTENNA WEIGHTS OF THE BASE STATION IN A UMTS MOBILE RADIO RECEIVER BY USE OF THE VITERBI ALGORITHM WITH FED-BACK TRANSMISSION DIVERSITY

REFERENCE TO RELATED APPLICATIONS

This application claims the benefit of the priority date of German application DE 103 51 051.6, filed on Oct. 31, 2003, the contents of which are herein incorporated by reference in their entirety.

FIELD OF THE INVENTION

The present invention relates to a method and an apparatus for verification of the antenna weights for the two base station antennas in a UMTS mobile radio receiver.

BACKGROUND OF THE INVENTION

In a mobile radio system that comprises a base station with two antennas and a mobile radio subscriber, there is a fixed phase relationship between the two transmission channels, which can respectively be associated with one of the antennas of the base station. In the UMTS (Universal Mobile Telecommunications System) Standard, the relationship between the signals emitted from the two antennas can be influenced by means of a so-called CLTD (Closed Loop Mode Transmit Diversity) function in order in this way to achieve constructive interference between the two transmission channels. The CLTD function can be operated in a mode 1 and in a mode 2. In mode 1, the phase of one of the two antennas can be varied, while the phase of the other antenna remains fixed. Overall, this results in the phase relationship between the two antennas being varied. In addition to the variation of the phase relationship known from mode 1, mode 2 provides for variation of the amplitudes of the signals emitted from the antennas. The amplitudes of both antennas can be varied in mode 2.

The CLTD function is described in the UMTS Specification 3GPP TS 25.214. This specification, in particular Section 7 and Annex A, is hereby incorporated by reference in the present application. This specification is referred to repeatedly in the following text. All the details in this case relate to Version V5.6.0 (2003-09).

The CLTD function allows FSM (Feedback Signalling Message) data words to be formed from estimated channel impulse responses in the mobile radio, and these are transmitted to the base station. The channel impulse responses of both channels are always used for an FSM data word. The FSM data words contain information intended for the base station about the optimum phase relationship and, possibly, about the optimum amplitudes of the signals to be transmitted from the two antennas.

Two antennas are used for transmission in a base station for the transmission diversity method considered here. The base station forms two antenna weights $w_1$ and $w_2$ from one FSM data word, and these are applied to the signals that are intended to be emitted from the two antennas. This is illustrated in FIG. 1. In order to avoid the possibility of destructive interference between the signals from the two antennas, the payload data (DPDCH) and the so-called dedicated control data (DPCCH) in both transmission paths are multiplied by the complex weighting factors $w_1$ and $w_2$. The dedicated control data contains training symbols, which are referred to in the following text as dedicated pilots. In parallel with this, the so-called CPICH symbols or common pilots are transmitted as training data, and these are not multiplied by the weighting factors. Thanks to the orthogonal characteristics of the CPICH symbols, the channel parameters $h_{1,i}^{(p)}$ and $h_{2,i}^{(p)}$ relating to the two transmission antennas can be determined in the receiver. In contrast, the channel parameters estimated on the basis of the dedicated pilots are denoted $h_{1,i}^{(d)}$ and $h_{2,i}^{(d)}$. In the case of mode 2, it is only possible to estimate the resultant channel for the two antennas on the basis of the dedicated pilots, and its channel parameters are denoted $h_i^d$ in the following text.

The antenna weights are calculated in the base station on the basis of information that is sent back from the mobile part. The respective optimum transmission weights are determined in the mobile part by evaluation of the OPICH symbols, and are quantized using a rule which is known in the base station, are mapped onto a bit sequence, and are transmitted to the base station. In this case, one bit (the so-called FBI (feedback information) bit) is in each case transmitted for each UMTS time slot and the weights in the base station are then adapted. In the case of mode 1, the current weights are determined by a vector with two bits {b1, b2}, and they are thus dependent on the current transmitted bit and on a previous bit. In the case of mode 2, the current weights are determined by a vector with four bits {b1, b2, b3, b4}, that is to say in this case the memory is four bits. These transmission weights must be taken into account during the demodulation of the received data in the mobile part. The previously determined, quantized weights may be used in this case. Channel influences can result in transmission errors during the transmission of the FBI bits to the base station. This leads to the weights assumed for the demodulation in the mobile part differing from the actually used transmission weights, and this leads to serious errors in the demodulation of the data. Simulations show that the receiver performance required by the Standard cannot be achieved in this way. In order to avoid this, so-called antenna verification is used in the receiver to check whether the antenna weights being used in the transmitter actually match the path weights calculated in the mobile part. In the event of a discrepancy, the weights are appropriately corrected.

Methods for antenna verification for both mode 1 and mode 2 are proposed in Annex A of the Standard mentioned initially. A test of two hypotheses is proposed for mode 1, specifically based on the inequality:

$$2\sum_{i=1}^{N_{path}} \frac{1}{\sigma_i^2} \{\sqrt{2}\,\text{Re}(\gamma h_{2,i}^{(d)} h_{2,i}^{(p)*})\} > \ln\left(\frac{\overline{p}(\phi_{Rx}=\pi)}{\overline{p}(\phi_{Rx}=0)}\right) \quad (1)$$

for even-numbered UMTS time slots and $$-2\sum_{i=1}^{N_{path}} \frac{1}{\sigma_i^2} \{\sqrt{2}\,\text{Im}(\gamma h_{2,i}^{(d)} h_{2,i}^{(p)*})\} > \ln\left(\frac{\overline{p}(\phi_{Rx}=\pi/2)}{\overline{p}(\phi_{Rx}=-\pi/2)}\right) \quad (2)$$

for odd-numbered UMTS time slots.

The bit that is actually being used can then be deduced on the basis of the result of this hypothesis test. Since the weight for antenna 1 is constant in mode 1, and the weight for antenna 2 can assume only four discrete values with a large Euclidean distance, the reliability of the verification process described by the formulae (1) and (2) is intrinsically very high.

A test of 16 hypotheses is proposed for mode 2. In this case the maximization:

$$(\hat{w}_1, \hat{w}_2) = \arg\max_{w_1, w_2 \in T} \{\ln(\hat{p}(w_1, w_2)) + \ln(\bar{p}(w_1, w_2))\} \quad (3)$$

is carried out, where $\bar{p}(w_1, w_2)$ is the a-priori probability of the occurrence of a weight pair $(w_1, w_2)$. This can be calculated from the (known) transmitted FBI bit and from a hypothesis for the error probability during the transmission of the FBI bits. The probability of the presence of a specific weight pair that can be determined on the basis of the training symbols is calculated using $$\ln(\hat{p}(w_1, w_2)) = -\left( \sum_{i=1}^{N_{path}} \frac{|h_i^{(d)} - \gamma(w_1 h_{1,i}^{(p)} + w_2 h_{2,i}^{(p)})|^2}{\sigma_i^2 (1 + \gamma^2(|w_1|^2 + |w_2|^2))} \right) \quad (4)$$

where $h_i^{(d)}$ are the channel parameters determined on the basis of the dedicated pilot channel for the resultant channel of the two antennas, $h_{1,i}^{(p)}$ and $h_{2,i}^{(p)}$ are the channel parameters for the antennas 1 and 2 determined on the basis of the common pilot channel, $\gamma^2$ is the ratio between the signal-to-interference-and-noise (SINR) values for the DPCH pilot channel and for the CPICH channel, $N_{path}$ is the number of propagation paths, and $\sigma_2^2$ is the sum of the noise and interference power on the i-th propagation path.

This procedure involves the two following disadvantages. The decision metrics used are based only on the currently received training symbols. Since both weights are modified in the case of mode 2 and the constellations of possible weight factors have considerably shorter Euclidean distances than in the case of mode 1, there is a major risk of the weights being determined incorrectly. Particularly in the case of mode 2, in which the phase differences between the weights in question are smaller, and in the case of a metric which is based on only one received symbol, the risk of incorrect detection is relatively high. Furthermore, in the case of mode 2, the complexity of the solution is also very high, since 16 metrics must be calculated using equation (4), with the calculation of each individual metric on its own intrinsically being considerably more complex than in the case of mode 1.

SUMMARY OF THE INVENTION

The following presents a-simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention is directed to a method for verification of the antenna weights of the base station in a UMTS mobile radio receiver, by means of which the risk of incorrect detections is reduced.

The present invention is based on the idea that the currently used weight is dependent not only on the currently transmitted FBI bit but also on previously transmitted bits. In principle, this allows the antenna verification process to be based on not just one but on a number of received training symbols, thus greatly improving the detection reliability.

The present invention accordingly relates to a method for verification of a bit vector which is being transmitted from a mobile station to a base station that has two antennas, containing weighting factors $(w_1, w_2)$ for the amplitudes and/or phases of the signals to be emitted from the antennas, in which updates of the bit vector are produced by changing one and only one bit position in the bit vector at a time and by transmitting this from the mobile station to the base station in the form of a bit b (0 or 1). The method is carried out in the mobile station on the basis of the training symbols which have been transmitted from the base station and received by the mobile station, in order to determine what weighting factors have been used in the base station, with currently transmitted and previously transmitted training symbols being taken into account in the method.

The bit b may in this case be the initially mentioned, standard FBI bit in the UMTS Standard. One FBI bit is thus transmitted from the mobile station to the base station in each UMTS time slot, in order to update the bit vector.

The method according to the invention will be explained in the following text for the case of the standard mode 2, as described initially, since its application is particularly advantageous for this purpose. However, in principle, the method can be used just as well for mode 1. In mode 2, one FBI bit is transmitted in each time slot, with one of the bits of the bit vector {b1, b2, b3, b4} in each case being updated successively. The basis for the method according to the invention is thus that it is not possible to reach any desired subsequent state starting from one specific state.

Instead of making the decision on the antenna weights that have been used in the base station only on the basis of the currently received training data in the mobile station, the training data from previous UMTS time slots is also taken into account. Since only one bit of the bit vector can ever be changed in one time slot, the bit vector can change its state only in a specific manner. The memory of the CLTD method is thus used to a certain extent for the method according to the invention. In a corresponding manner, the problem no longer relates to the detection of a single value, but to the detection of a value sequence, so that it is possible to apply the principle of maximum likelihood sequence estimation (MLSE) to the problem.

The Viterbi algorithm may be used for implementation of the method according to the invention. For this purpose, a trellis diagram can first of all be set up comprising the possible states of the bit vector and the possible state changes or branches between the states. The Viterbi algorithm can be used for determination of the weighting factors that have been used by the base station, by associating a cumulative metric with each state, by defining a branch metric as a function of the received training symbols and by calculating a branch metric for each of the branches which lead to a state, by calculating the cumulative metric for each individual state, by determining the state with the largest cumulative metric, and by selecting the weighting factors which are associated with this state.

The branch metric $\Delta m_{p,k}^b$ can be defined by:

$$\Delta m_{p,k}^b = \{\ln(\hat{p}(\overline{w}_1, \overline{w}_2)) + \ln(\bar{p}(\overline{w}_1, \overline{w}_2))\} \quad (5)$$

where $(\overline{w}_1, \overline{w}_2)$ is a pair of weighting factors corresponding to the state transition and $\bar{p}(w, w_2)$ is an a-priori probability for the occurrence of a weighting pair $(\overline{w}_1, \overline{w}_2)$, and $\bar{p}(w, w_2)$ is calculated from the transmitted bit b and from a hypothesis for the error probability for the transmission of the bit b, and $$\ln(\hat{p}(\overline{w}_1, \overline{w}_2)) = -\left(\sum_{i=1}^{N_{path}} \frac{|h_i^{(d)} - \gamma(\overline{w}_1 h_{1,i}^{(p)} + \overline{w}_2 h_{2,i}^{(p)})|^2}{\sigma_i^2(1 + \gamma^2(|\overline{w}_1|^2 + |\overline{w}_2|^2))}\right) \qquad (5)$$

is the probability of occurrence of a weight pair $(\overline{w}_1, \overline{w}_2)$ which can be determined from the training symbols; where $h_i^{(d)}$ are the channel parameters, determined on the basis of the dedicated pilot channel, of the resultant channel for both antennas, $h_{1,i}^{(p)}$ and $h_{2,i}^{(p)}$ are the channel parameters, determined on the basis of the common pilot channel, for the antennas 1 and 2, $\gamma^2$ is the ratio between the signal-to-interference-and-noise (SINR) values for the DPCH pilot channel and for the CPICH channel, $N_{path}$ is the number of propagation paths, and $\sigma_i^2$ is the sum of the noise and interference power on the i-th propagation path.

The above branch metric from equation (5) represents only one example for the calculation of a branch metric that is based on the above equation (3) in the Standard. In practice, it could be advantageous to use simplified branch metrics derived from this.

The cumulative metric $m_{p,k}$ for a state can be calculated by means of $$m_{p,k} = m_{p,k-1} + \max_b(\Delta m_{p,k}^b) \qquad (6)$$

where p is an index for the states and k is an index for the time steps, $m_{p,k-1}$ is the cumulative metric for the previous state, and $\max_b(\Delta_{p,k}^b)$ is the maximum of the branch metrics $\Delta m_{p,k}^b$ of the branches leading to that state.

The Viterbi algorithm that is used for implementation may be simplified by adaptively further tracking only the trellis that is covered by the respective M most probable states, rather than the complete trellis. If the total number of states is N, it is possible for only M≦N/2 state variables to be followed; in that subsequent states are produced on the basis of an initialization state in the trellis diagram in successive time steps until M state variables have each been assigned a value of the cumulative metric. 2M subsequent states with cumulative metrics are calculated for these M state variables, the cumulative metrics are sorted on the basis of their magnitude, and only the M largest states are assigned to the M state variables and the remaining states are rejected and are not followed any further.

An apparatus for carrying out the method according to the invention has a metric calculation unit for the calculation of the branch metrics $\Delta m_{p,k}^b$ and the cumulative metrics $m_{p,k}$ from the received training symbols, the a-priori probability $\overline{p}(w_1, w_2)$ for the occurrence of a pair of weighting factors, and a sorting and selection unit for sorting the cumulative metrics on the basis of their magnitude and for emitting the pair of weighting factors $(w_1, w_2)$ which correspond to the state having the highest cumulative metric.

The apparatus may additionally have a status memory unit for storage of the M states whose cumulative metrics have the highest magnitudes, with the sorting and selection unit being designed to supply the M states whose metrics have the highest magnitudes to the status unit memory unit, and the status memory unit being designed to supply the M state variables to be followed and the associated M stored cumulative metrics to the metric calculation unit.

BRIEF DESCRIPTION OF THE DRAWINGS

The invention will be explained in more detail in the following text using exemplary embodiments and in conjunction with the drawing figures, in which.

DETAILED DESCRIPTION OF THE INVENTION

Figure 1:
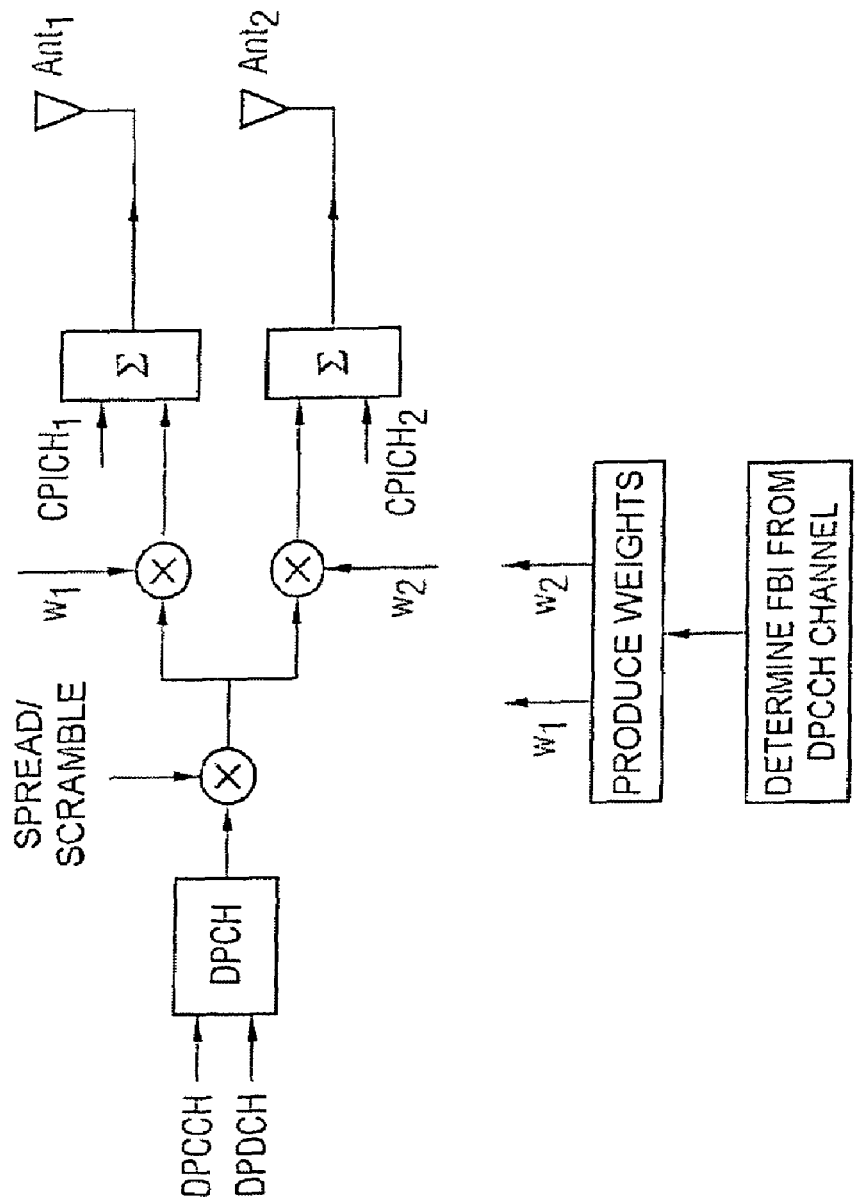
FIG. 1 shows a schematic block diagram of the standard CLTD method.
Figure 2:
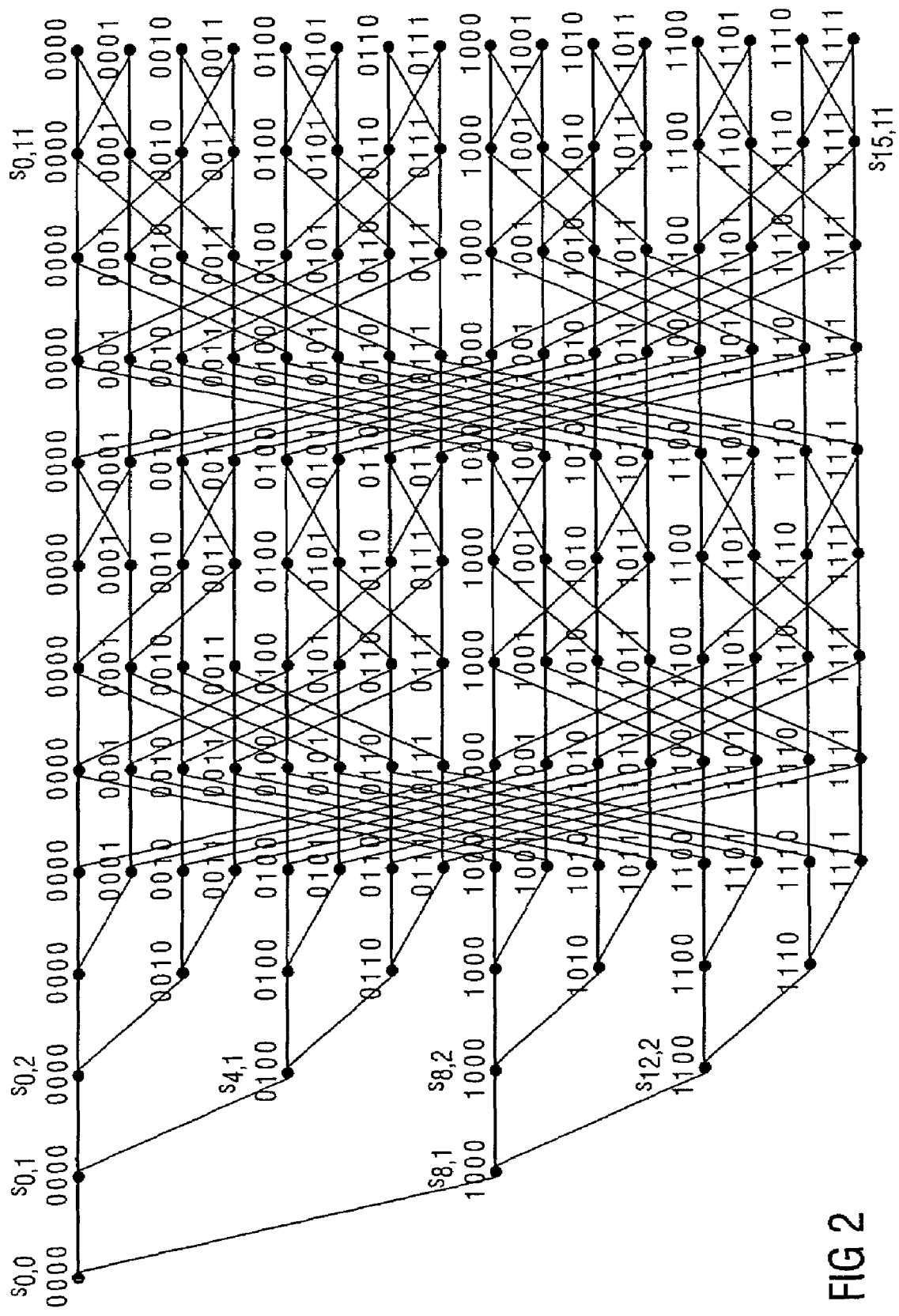
FIG. 2 shows a trellis diagram for a method according to the invention applied to the standard mode 2.

The trellis diagram shown in FIG. 2 relates to the situation in which one FBI bit is transmitted in each UMTS time slot in accordance with the standard mode 2, with one of the bits of the bit vector {b1, b2, b3, b4} in each case being updated successively. Updating may comprise the corresponding bit position remaining unchanged or a change taking place from 0 to 1 or from 1 to 0 at the corresponding bit position. Each bit vector in this case uniquely identifies one pair of antenna weights $(w_1, w_2)$. A state $s_{p,k}$ is associated with each bit vector {b1, b2, b3, b4} in the following text.

In this case, k denotes the k-th reception time slot, and p ∈ {0, 1, . . . , M−1}, where M=16. In accordance with the quantization rule specified in the Standard, it is not possible to reach every other subsequent state starting from a certain state $s_{p,k}$. The trellis diagram starting from the state $s_{0,0} \rightarrow \{0,0,0,0\}$ is shown in FIG. 2.

On the basis of this structuring of the problem, a maximum likelihood method such as the Viterbi algorithm may be used in order to determine the antenna weights that are currently being transmitted. A cumulative metric $m_{p,k}$ is associated in a corresponding manner with each state $s_{p,k}$. As can be seen from FIG. 2, two state changes (branches) in each case essentially lead to each state, and each correspond to the hypothesis for the FBI bit (b=1 or b=0) detected by the base station. A branch metric $\Delta m_{p,k}^b$ is calculated for each of the branches that lead to a state p in the time slot k. If the available a-priori information is inserted into the calculation, then this results in a possible branch metric becoming:

$$\Delta m_{p,k}^b = \{ln(\hat{p}((\overline{w}_1, \overline{w}_2)) + \ln(\overline{p}(\overline{w}_1, \overline{w}_2))\} \qquad (5)$$

where $(\overline{w}_1, \overline{w}_2)$ is the weight pair which corresponds to the state transition and to the hypothesis for the transmitted FBI bit b. As mentioned initially, $\overline{p}(\overline{w}_1, \overline{w}_2)$ is the a-priori probability or information for the occurrence of a weight pair $(\overline{w}_1, \overline{w}_2)$, which can be calculated from the known transmitted FBI bit and a hypothesis for the error probability for the transmission of the FBI bits, while $\ln(\hat{p}(\overline{w}_1, \overline{w}_2))$ is the probability for the occurrence of the weight pair $(\overline{w}_1, \overline{w}_2)$ which can be determined on the basis of the training symbols, and is given by the equation (3). In the above equation (5), $(\overline{w}_1, \overline{w}_2)$ is the weight pair which corresponds to the state transition and to the hypothesis for the transmitted FBI bit b.

The accumulated metrics for the individual states are now calculated on the basis of the structure of the Viterbi algorithm in accordance with the rule:

$$m_{p,k} = m_{p,k-1} + \max_b(\Delta m_{p,k}^b) \qquad (6)$$

In contrast to the classical Viterbi approach, the decision on the weights is not made until after the evaluation of further (future) received values, but is made directly after consideration of the current metric increment. In this case, the state $s_{p,k}$ with the greatest cumulative metric $m_{p,k}$ is determined first. The weight pair $(w_1, w_2)$ that corresponds to this is then recommended as the most probable weight pair.

The decision confidence that can be achieved using the solution described above for the respective antenna weights is considerably higher than that with the hypothesis test proposed in the Standard. However, the complexity is initially still relatively high if all of the N states in the trellis diagram are considered and followed. Since the signal-to-noise power ratio is relatively high in comparison to the decision to be made, the method can be simplified in the following manner.

Instead of having to consider all N=16 states, only M≦N/2 state variables $\bar{s}_{q,k}$ are followed. These state variables may assume all N states $s_{q,k}$ as their value. During the initialization process, the assignment $\bar{s}_{0,0}=s_{1,0}$ is implemented first of all, with $s_{1,0}$ being the initialization state in accordance with the Standard.

On the basis of the applicable trellis diagram, the subsequent states are then determined for the hypotheses b=0 and b=1, and are assigned to the two state variables $\bar{s}_{0,1}$ and $\bar{s}_{1,1}$. The procedure as in the original algorithm is initially continued until all M state variables $\bar{s}_{q,k}$ have been assigned a value. The 2M subsequent states $\bar{s}_{q,k}$ are then calculated for these M state variables. The 2M states are then sorted in decreasing order of the magnitude of the accumulated metrics $\bar{m}_{q,k}$, and the M greatest states are assigned to the M state variables $\bar{s}_{q,k}$. The remaining states are rejected. The weight pair that corresponds to the state $\bar{s}_{0,k}$ is then in each case used as the hypothesis for the transmitted weight pair, in accordance with this rule. If, by way of example, M is now chosen to be equal to N/4, then the number of metrics to be calculated is reduced by a factor of 2 in comparison to the complete hypothesis test, and even better results can be achieved by taking into account the memory.

Figure 3:
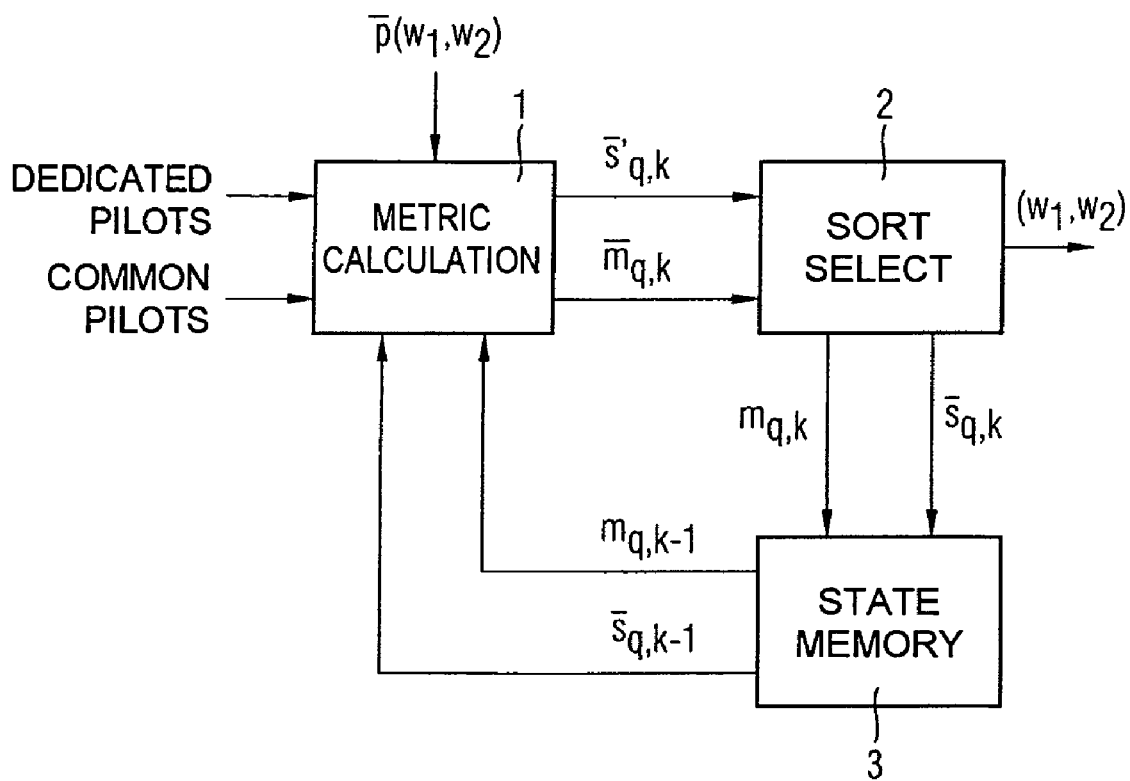
FIG. 3 shows an exemplary embodiment of an apparatus for carrying out the method according to the invention.

FIG. 3 illustrates an apparatus for carrying out the method that allows the restriction, described further above, to the M most probable states.

A metric calculation unit 1 is supplied not only with the dedicated pilot signals but also with the common pilot signals. Furthermore, the metric calculation unit 1 is supplied with the a-priori information $\bar{p}(w_1,w_2)$ and with the state variables $\bar{s}_{q,k-1}$, which are stored in a state memory unit 3, and their associated cumulative metrics $m_{q,k-1}$. In the next time step, the metric calculation unit 1 uses these variables to calculate the new state variables $\bar{s}_{q,k}$ and their associated cumulative metrics $\bar{m}_{q,k}$ and transfers these variables to a sorting and selection unit 2, in which the cumulative metrics are sorted and the weight factors $w_1$ and $w_2$ are emitted on the basis of the cumulative metric with the highest magnitudes. Furthermore, the sorting and selection unit 2 emits the M cumulative metrics $m_{q,k}$ with the largest magnitudes, and their associated state variables $\bar{s}_{q,k}$, to the state memory unit 3.

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method for verification of a bit vector which is transmitted from a mobile station to a base station that comprises two antennas and weighting factors $(w_1, w_2)$ for amplitudes and/or phases of the signals to be emitted from the antennas, wherein the transmitted bit vector is employed in the base station to determine the weighting factors, comprising:

updating the bit vector in the mobile station by changing only one bit position in the bit vector at a time and transmitting the updated bit vector from the mobile station to the base station in the form of a bit, wherein the updated bit vector is associated with target weighting factors;

transmitting current training symbols from the base station to the mobile station using updated weighting factors based on the updated bit vector received from the mobile station; and determining in the mobile station whether the updated weighting factors match the target weighting factors by evaluating the transmitted current training symbols from the base station and previously transmitted training symbols therefrom, where determining whether the updated weighting factors match the target weighting factor comprises:

establishing a trellis diagram comprising possible states of the updated bit vector and possible state changes or branches between them;

executing a Viterbi algorithm on the trellis diagram to determine the updated weighting factors being used by the base station; and comparing the updated weighting factors to the target weighting factors, where executing the Viterbi algorithm comprises:

associating a cumulative metric with respective states;

defining a branch metric as a function of the transmitted training symbols from the base station, wherein the branch metrics $\Delta m_{p,k}^{b}$ are defined by $$\Delta m_{p,k}^{b} = \{\ln(\hat{p}(\bar{w}_1, \bar{w}_2)) + \ln(\bar{p}(\bar{w}_1,\bar{w}_2))\}$$

where $(\bar{w}_1, \bar{w}_2)$ is a pair of weighting factors corresponding to the state transition and $\bar{p}(w_1, w_2)$ is an a-priori probability for the occurrence of the weighting pair $(\bar{w}_1, \bar{w}_2)$, and $\hat{p}(w_1, w_2)$ is calculated from the transmitted bit associated with the updated bit vector and from a hypothesis for the error probability for the transmission of the bit associated with the updated bit vector, and $$\ln(\hat{p}(\bar{w}_1, \bar{w}_2)) = -\left(\sum_{i=1}^{N_{path}} \frac{|h_i^{(d)} - \gamma(\bar{w}_1 h_{1,i}^{(p)} + \bar{w}_2 h_{2,i}^{(p)})|^2}{\sigma_i^2(1 + \gamma^2(|\bar{w}_1|^2 + |\bar{w}_2|^2))}\right)$$

where $h_i^{(d)}$ are channel parameters determined on the basis of a dedicated pilot channel for both antennas, $h_{1,i}^{(p)}$ and $h_{2,i}^{(p)}$ are channel parameters determined on the basis of a common pilot channel for both antennas, $\gamma^2$ is the ratio between the signal-to-interference-and-noise (SINR) values for a DPCH pilot channel and for a CPICH channel, $N_{path}$ is the number of propagation paths, and $\sigma_i^2$ is the sum of the noise and interference power on the i-th propagation path;

calculating a branch metric for respective branches of the trellis diagram that lead to a state;

calculating a cumulative metric for respective states;
determining the state with the largest cumulative metric; and
selecting the weighting factors ($w_1$, $w_2$) which are associated with the largest cumulative metric as the updated weighting factors, where if a total number of possible states as dictated by the bit vector is N, merely $M \leq N/2$ state variables associated with the trellis diagram are followed such that the method comprises:
producing subsequent states on the basis of an initialization state in the trellis diagram in successive time steps until M state variables have been assigned respective cumulative metric values;
calculating 2M subsequent states with cumulative metrics for the M state variables;
sorting the 2M cumulative metrics on the basis of their magnitude; and
assigning the M largest states to the M state variables and rejecting the remaining states such that they are no longer followed.

2. The method according to claim 1, wherein the cumulative metric $m_{p,k}$ of a state is calculated by $$m_{p,k} = m_{p,k-1} + \max_b(\Delta m_{p,k}^b)$$

where p is an index for the states and k is an index for the time steps, $m_{p,k-1}$ is the cumulative metric for the previous state, and $\max_b(\Delta_{p,k}^b)$ is the maximum of the branch metrics $\Delta m_{p,k}^b$.

3. A method of verifying antenna weights employed in a base station employing multiple antennas for transmission to a mobile station, comprising:
determining optimum antenna weights in the mobile radio station by evaluating training symbols transmitted by the base station to the mobile radio station;
generating a bit sequence based on the determined optimum antenna weights and transmitting the bit sequence from the mobile station to the base station, wherein a bit associated with the bit sequence is transmitted for each time slot;
modifying the antenna weights at the base station based on the bit sequence; and
evaluating current training symbols at the mobile station transmitted by the base station based on the modified antenna weights and training symbols previously received from the base station to determine if the modified antenna weights at the base station match the set of optimum antenna weights and thus verifying a transmission accuracy of the bit vector from the mobile station to the base station, where determining whether the modified weighting factors match the optimum weighting factors comprises:
establishing a trellis diagram comprising possible states of the updated bit vector and possible state changes or branches between them;
executing a Viterbi algorithm on the trellis diagram to determine the updated weighting factors being used by the base station; and
comparing the updated weighting factors to the target weighting factors, where executing the Viterbi algorithm comprises:
associating a cumulative metric with respective states;
defining a branch metric as a function of the transmitted training symbols from the base station, wherein the branch metrics $\Delta m_{p,k}^b$ are defined by $$\Delta m_{p,k}^b = \{\ln(\hat{p}(\overline{w}_1, \overline{w}_2)) + \ln(\overline{p}(\overline{w}_1, \overline{w}_2))\}$$

where $(\overline{w}_1, \overline{w}_2)$ is a pair of weighting factors corresponding to the state transition and $\overline{p}(w_1, w_2)$ is an a-priori probability for the occurrence of the weighting pair $(\overline{w}_1, \overline{w}_2)$, and $\hat{p}(w_1, w_2)$ is calculated from the transmitted bit associated with the updated bit vector and from a hypothesis for the error probability for the transmission of the bit associated with the updated bit vector, and $$\ln(\hat{p}(\overline{w}_1, \overline{w}_2)) = -\left(\sum_{i=1}^{N_{path}} \frac{|h_i^{(d)} - \gamma(\overline{w}_1 h_{1,i}^{(p)} + \overline{w}_2 h_{2,i}^{(p)})|^2}{\sigma_i^2(1 + \gamma^2(|\overline{w}_1|^2 + |\overline{w}_2|^2))}\right)$$

where $h_i^{(d)}$ are channel parameters determined on the basis of a dedicated pilot channel for both antennas, $h_{1,i}^{(p)}$ and $h_{2,i}^{(p)}$ are channel parameters determined on the basis of a common pilot channel for both antennas, $\gamma^2$ is the ratio between the signal-to-interference-and-noise (SINR) values for a DPCH pilot channel and for a CPICH channel, $N_{path}$ is the number of propagation paths, and $\sigma_i^2$ is the sum of the noise and interference power on the i-th propagation path;
calculating a branch metric for respective branches of the trellis diagram that lead to a state;
calculating a cumulative metric for respective states;
determining the state with the largest cumulative metric; and
selecting the weighting factors ($w_1$, $w_2$) which are associated with the largest cumulative metric as the updated weighting factors, where if a total number of possible states as dictated by the bit vector is N, merely $M \leq N/2$ state variables associated with the trellis diagram are followed such that the method comprises:
producing subsequent states on the basis of an initialization state in the trellis diagram in successive time steps until M state variables have each been assigned a cumulative metric value;
calculating 2M subsequent states with cumulative metrics for the M state variables;
sorting the 2M cumulative metrics on the basis of their magnitude; and
assigning the M largest states to the M state variables and rejecting the remaining states such that they are no longer followed.

4. The method according to claim 3 wherein the cumulative metric $m_{p,k}$ of a state is calculated by $$m_{p,k} = m_{p,k-1} + \max_b(\Delta m_{p,k}^b)$$

where p is an index for the states and k is an index for the time steps, $m_{p,k-1}$ is the cumulative metric for the previous state, and $\max_b(\Delta_{p,k}^b)$ is the maximum of the branch metrics $\Delta m_{p,k}^b$.

* * * * *